Dec. 24, 1963 J. E. BRELSFORD 3,115,117
CONVEYING APPARATUS WITH METERING DISCHARGE MEANS
Filed April 27, 1962 2 Sheets-Sheet 1
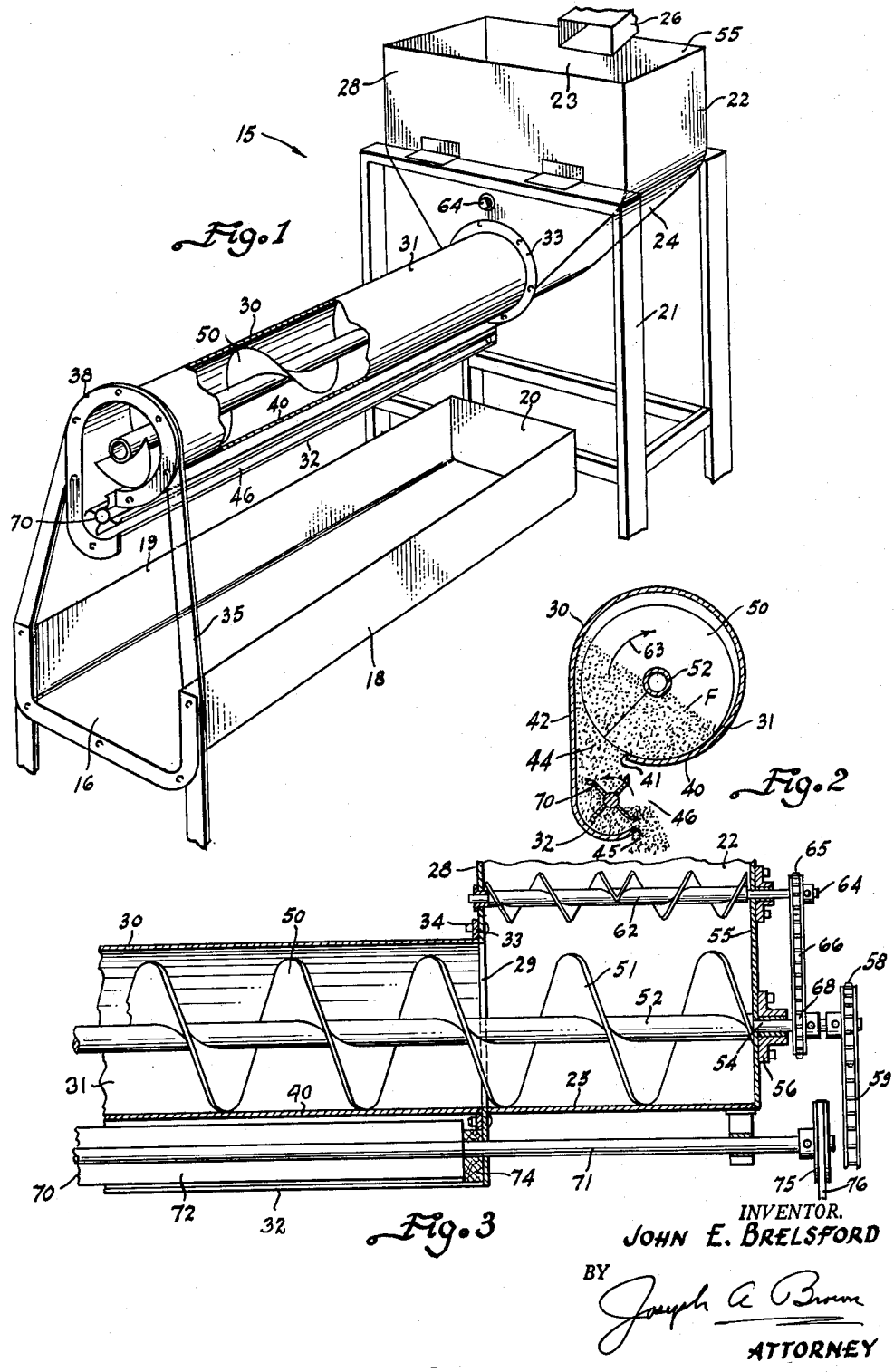
INVENTOR.
JOHN E. BRELSFORD
BY
Joseph A. Brown
ATTORNEY Dec. 24, 1963 J. E. BRELSFORD 3,115,117
CONVEYING APPARATUS WITH METERING DISCHARGE MEANS
Filed April 27, 1962 2 Sheets-Sheet 2

INVENTOR.
JOHN E. BRELSFORD
BY Joseph A. Brown
ATTORNEY

United States Patent Office 3,115,117
Patented Dec. 24, 1963

3,115,117
CONVEYING APPARATUS WITH METERING
DISCHARGE MEANS
John E. Brelsford, Terre Hill, Pa., assignor to Sperry
Rand Corporation, New Holland, Pa., a corporation of
Delaware
Filed Apr. 27, 1962, Ser. No. 190,751
10 Claims. (Cl. 119—56)

In feeding steers and other stock animals, it is desirable to have all the animals get their feed at the same time. This eliminates crowding by the animals to locations which receive feed first. If feed is deposited in all portions of a feed trough at the same time, the animals will become accustomed to the procedure and stand quietly awaiting the feed. All the animals will have an equal opportunity to feed and all can begin feeding simultaneously.

Heretofore, fill-and-dump stock feeders have been constructed which achieve simultaneous feeding along all portions of a feed trough. However, such feeders are relatively complicated and involve a substantial number of moving parts. As a result, the feeders are relatively expensive.

The main object of this invention is to provide a stock feeder which will operate to deliver feed to all portions of a feed trough at the same time, employing a structure which is less complicated and has less moving parts than similar type feeders of prior design whereby the feeder is relatively inexpensive to manufacture.

Another object of this invention is to provide a stock feeder of the character described which will operate to simultaneously discharge feed to all portions of a feed trough, the discharge continuing uninterrupted until all of the feed which the animals are to receive at that particular feeding has been dispensed.

Another object of this invention is to provide a stock feeder which will operate continuously during a particular feeding operation, repeated fill-and-dump cycles, stopping and starting being eliminated.

Another object of this invention is to provide a stock feeder having an auger for conveying and distributing feed throughout the length of a feed container, the auger being free floating on a supporting surface and not running empty at one end or the other of the device during several phases of a given feeding operation.

A further object of this invention is to provide a stock feeder which is so designed that controlling the operation thereof is relatively simple and reliable.

A still further object of this invention is to provide a stock feeder which will operate to uniformly distribute feed along an elongated feed trough, the feed being deposited in a continuous substantially uninterrupted ribbon of feed.

Other objects of this invention will be apparent hereinafter from the specification and from the recital in the appended claims.

In the drawings:

FIG. 1 is a perspective view of a stock feeder constructed according to this invention, a section of the elongated container portion thereof being broken away to show the conveying and distributing means;

FIG. 2 is an enlarged transverse vertical section through the distributing portion of the feeder;

FIG. 3 is an enlarged, longitudinal, vertical section through the stock feeder;

Figure 4:
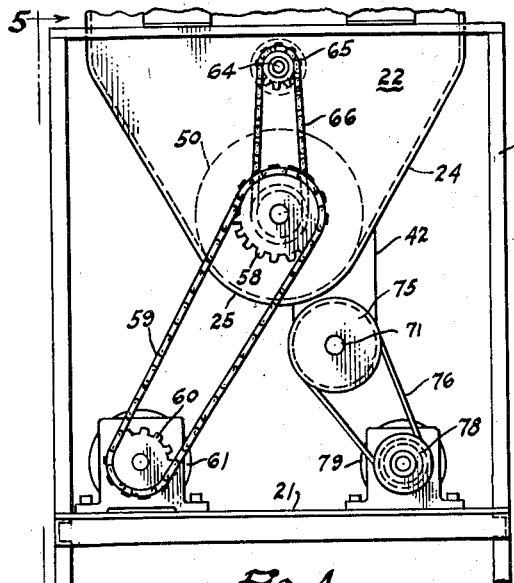
FIG. 4 is an end view of the feeder looking at the device adjacent the supply hopper end thereof and showing in particular the means for driving the feeder.

Referring now to the drawings by numerals of reference, and first to FIG. 1, 15 denotes generally a stock feeder adapted to deliver shelled corn, silage or other feeds to a horizontally extending elongated trough 16. The trough 16 may be of any desired length such as one hundred feet and it is provided with side walls 18 and 19 to confine feed deposited therein. Conventionally, the trough is made up of sections each of which may be of any desired length such as ten feet. The overall length of the trough is then determined by the number of trough sections interconnected. At one end 20 of the trough 16, a support frame 21 is provided which carries a supply hopper 22. The hopper 22 has converging bottom walls 24 and a curved bottom portion 25. Hopper 22 is opened at its top 23 to receive feed from a chute 26 which may receive feed from a silo unloader or other means. When feed is discharged into hopper 22 from chute 26, it gravitates to the bottom of the hopper.

Hopper 22 has a vertical side wall 28 formed with an outlet opening 29 (FIG. 3) in the bottom thereof. Opening 29 is cylindrical, the curved bottom portion 25 of the hopper forming the bottom of the opening. Extending outwardly from side wall 28 and parallel to trough 16 is feed distributing means comprising a feed container 30 having an upper section 31 and a lower section 32. Container 30 is flanged at 33 and connected by bolts 34 to the side wall 28. The container has a length substantially the same as the length of the trough 16. It is supported above and in register with the trough by supports 35, there being a support for the container at each ten foot connection location. At each connection, container 30 has a flange 38 so that successive container sections may be interconnected.

As shown best in FIG. 2, each container section is made of one continuous piece of sheet metal, formed as shown. The upper section 31 is generally tubular, providing a curved bottom portion 40 having a terminal edge 41 which is parallel to the axis of the container. Upper section 31 is connected to the lower section 32 by a vertical wall portion 42 spaced from the edge 41 to thereby provide an opening 44 which extends uninterrupted along the full length of container 30. The lower section 32 has a linear edge 45 spaced beneath the curved bottom 40 of the upper section 31 and forming a discharge outlet 46. The lower portion 32 is arcuate, as shown.

For withdrawing feed F from hopper 22 and conveying and distributing the feed through the full length of container 30, an auger 50 is provided having a section 51 which extends into the hopper. The diameter of auger 50 is somewhat less than the diameter of upper section 31 of the container 30, being however of substantial size and supported on the bottom portion 40 of section 31. A portion of the auger overhangs opening 44. The auger includes a shaft 52 having a portion 54 extending through vertical wall 55 of hopper 22. Shaft portion 54 is suitably supported by a bearing 56 and the outer end thereof has a sprocket 58 affixed thereto. Sprocket 58 is connected by an outer endless chain 59 to a sprocket 60 adapted to be rotated by drive means in the form of a motor 61. Motor 61 is carried on support frame 21 for hopper 22. When operated, the motor drives auger 50 in the direction indicated by the arrow 63 in FIG. 2. Material F is removed from the hopper 22 and conveyed and distributed throughout the length of upper section 31 of the container 30 and along the opening 44. Hopper 22 is kept supplied with material from chute 26 so that as material is removed from the hopper, other material is added. To prevent bridging of the material in the hopper, an agitator 62 is provided above auger section 51 and supported on the side walls 28 and 55 of the hopper 22. Agitator 62 has a shaft 64 which projects outwardly of hopper wall 55. Shaft 64 has a sprocket 65 connected by a chain 66 to sprocket 68 keyed to the shaft 54 of the auger 50. Thus, when the auger is operated, the agitator is also operated.

Figure 6:
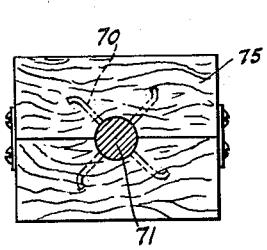
FIG. 6 is an enlarged view showing one of the bearing supports for the metering means of the feeder.
Figure 9:
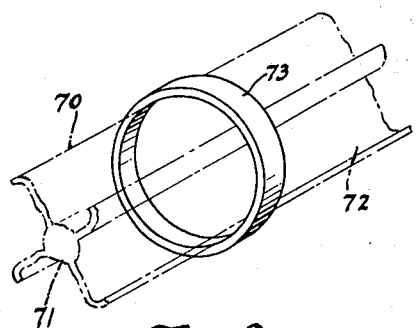
FIG. 9 is an enlarged view showing an alternative bearing support means for the metering means.

When feed is conveyed and distributed throughout the length of container 30 by means of the auger 50, material falls downwardly through the continuous opening 44 interconnecting upper section 31 with the lower section 32. However, the fall of feed is controlled by a metering roll 70 having a shaft 71 and four angularly spaced vanes 72 curved at their outer ends, as shown. When stationary, the vanes on the metering roll hold back the feed and prevent its discharge through outlet 46. The material piles up on top of the metering roll 70 and the auger conveys and distributes the material throughout the length of container 30. A major portion of the feed is retained in section 31 and blocked by the metering roll from dropping through opening 44. The end of shaft 71 at the hopper 22 is supported by a wood block bearing 74, and similar bearings 75 (FIG. 6) are provided along the length of the metering roll to provide support therefor. Preferably, a support bearing is provided at each ten foot juncture of the device. If desired such bearings may be eliminated and rings 73 (FIG. 9) may be provided at spaced points along the metering roll to support the roll on lower section 32.

Figure 5:
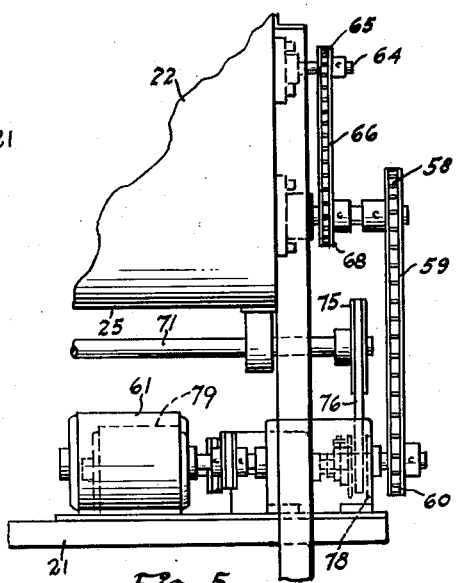
FIG. 5 is a fragmentary view taken on the line 5—5 of FIG. 4.

For rotating the metering roll, power means in the form of a pulley 75 is connected to the shaft 71 (FIGS. 3–5) and such pulley is in turn connected by a belt 76 to split pulley 78 operated by motor 79. Pulley 78 is of the conventional variable speed type (FIG. 8) having a half section 80 which is movable axially toward and away from a corresponding half section 81. The axial movement of the section 80 relative to section 81 is achieved by a collar 82 threaded on neck 84 and providing a simple means whereby the speed of rotation of the metering roll 70 may be manually varied as desired.

Suitable, conventional on-off switches, not shown, are provided for operating the motors 61 and 79. To perform a feeding operation, the operator starts the motor 61 to thereby provide power for rotating auger 50. As the auger rotates, it withdraws material F from the hopper 22 and conveys it away from the hopper and throughout the upper section 31 of the container 30. The angle of repose of the feed as it is conveyed is as shown in FIG. 2, being banked against container wall portion 42 by the flights of the auger. As the material is conveyed, it is also distributed along the length of the container. Some of the feed passes downwardly through opening 44. However, such feed is prevented from being discharged through the discharge outlet 46 by metering roll 70 which is not rotating. When the feed reaches a location adjacent the terminal end of the feeder device 15, or at some intermediate point, the operator starts motor 79 whereupon the metering roll 70 rotates to discharge material through outlet 46. The discharge rate of the metering roll 70 is such relative to the conveying rate of the auger 50 that a "head" of material is maintained along the full length of the container 30. When the material is discharged through the opening 46, it falls downwardly into the trough 16 and between side walls 18 and 19. Once a feeding begins to take place, the material falls in a continuous substantially uninterrupted ribbon of feed. As long as the auger 50 is conveying feed and maintaining a "head" of feed along the length of the container 30, the metering roll will operate to continuously and uniformly discharge it. The speed of the auger 50 and the rotation of the metering roll 70 are so related to each other that a continuous flow of feed is provided. To maintain proper operating equilibrium between auger 50 and metering roll 70, the collar 82 is employed to establish the proper speed of the metering roll 70.

When a sufficient amount of feed has been deposited in the hopper 22 from the chute 26, and no further feed is to be dispensed to the stock animals at that particular feeding operation, the input of feed from the chute 26 is cut off. Auger 50 is allowed to rotate until hopper 22 is substantially empty. Then, the auger 50 is stopped while the metering roll 70 is kept operating. The rotation of the metering roll will result in substantially emptying the container 30. Some feed will remain in the curved bottom portion 40 of the upper section 31. However, such slight amount of feed retention is desirable because it will support and lubricate the auger 50 in its operation. Except for being connected and supported at its terminal ends, auger 50 is free floating, being supported only by the curved bottom portion 40 of the upper section 31. In like respect, the metering roll 70 is in part supported by the curved bottom portion of the lower section 32 being however also supported by the wood blocks 74 and 75 engaging shaft 71.

Figures 7, 8:
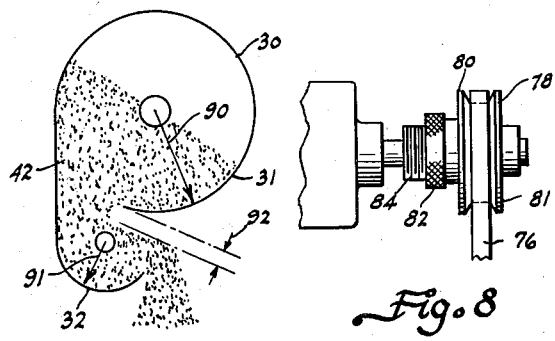
FIG. 7 is a diagrammatic view illustrating the relative arrangement of the feed distributing components of the feeder.
FIG. 8 is an enlarged fragmentary plan view showing the variable speed means provided for controlling the metering means.
Figure 10:
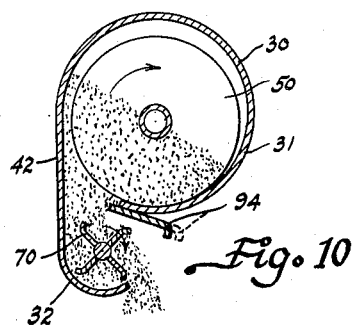
FIG. 10 is a view similar to FIG. 2 and showing a feeder constructed according to another embodiment of this invention.

When auger 50 is rotated as indicated by the arrow 63 in FIG. 2 and the metering roll is rotated in the opposite direction, the auger is forced toward upper section 31 in a direction indicated by the arrow 90 in FIG. 7. The metering roll is forced in a direction indicated by the arrow 91. Thus, both the auger and the metering roll are properly seated and supported during a feeding operation and when they are under load. Also as shown in FIG. 7 the diameter of the metering roll 70 is such relative to the construction of the container 30 that a space 92 is provided to help in preventing congestion in the passage of feed from the upper section 31 to the lower section 32. This facilitates the discharge of material. As shown in FIG. 10, the metering roll can be rotated in the opposite direction, if desired, and an adjustable slide valve plate 94 can be provided to vary the size of the opening 44 and thus secure closer control. The valve plate 94 can be used instead of varying the r.p.m. of the metering roll or in conjunction therewith.

With the structure described, when a flow of feed is started through outlet 46, the flow continues uninterrupted until the total supply of feed to be deposited at the given feeding operation is dispensed. No fill-and-dump or start and stopping of the discharge is involved. The control mechanism is very simple and low in cost. Since all portions of the feed trough get feed at the same time, the stock animals do not crowd and become excited. This provides greater weight gains with less feed.

While this invention has been described in connection with two embodiments thereof, it will be understood that it is capable of further modifications, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A device for feeding stock animals comprising, in combination, support means, a horizontally elongated generally tubular container fixedly mounted on said support means and having a substantially continuous discharge outlet in a bottom portion thereof and along a major portion of the length of the container, supply means communicating with an end of said container to provide feed therefor, a feed conveyor mounted within said container and extending along said outlet to distribute feed delivered by said supply means along the length of the container, rotatable metering means mounted on said support means across said outlet and controlling the discharge of material through the outlet, drive means operating said conveyor alone until said feed has been distributed along the container, and power means then rotating said metering means to discharge material at a given rate simultaneously along the length of the container and through said opening, the capacity of said conveyor being such relative to the discharge rate of said metering means that a quantity of material is maintained along said opening when the conveyor and metering means are both operating, and means for controlling the speed operation of said power means.

2. A device for feeding stock animals comprising, in combination, support means, an elongated, generally horizontally extending container fixedly mounted on said support means, said container having an upper section, a lower section and a longitudinal substantially continuous opening therebetween whereby the sections communicate with each other, said opening being located adjacent the bottom of said upper section and extending along a major portion of the length of the container, supply means communicating with said container upper section to provide feed therefor, a feed conveyor mounted within said upper section and extending along said opening to distribute feed provided by said supply means along the length of the container, rotatable metering means mounted within said lower section and controlling the downward passage of material thereto from said upper section and through said opening, said lower section having an outlet extending along a major portion of the length of the container through which material is discharged from the container on rotation of said metering means, drive means connected to said conveyor, and power means connected to said metering means.

3. A device for feeding stock animals comprising, in combination, support means, an elongated, generally horizontally extending container fixedly mounted on said support means, said container having a semi-circular upper section, a semi-circular lower section and a substantially continuous longitudinal opening therebetween extending along a major portion of the length of the container, supply means communicating with said upper section to provide feed for the container, said upper section having an arcuate bottom portion and said opening extending along one side of the bottom portion, an auger within said upper section and supported on said arcuate bottom portion, said auger being operable to convey and distribute feed provided by said supply means along the length of the container and to discharge material through said opening, said lower section having a curved bottom portion beneath said opening, a metering roll within said lower section and operable along said curved bottom portion, said metering roll controlling the downward passage of material thereto from said upper section and through said opening, said lower section having a substantially continuous outlet extending along a major portion of the length of the container through which material is discharged from the container on rotation of said metering roll, drive means operating said conveyor, and power means operating said metering roll.

4. A device for feeding stock animals as recited in claim 3 wherein said upper section and said lower section of said container are integral with each other and formed from the same structural element.

5. A device for feeding stock animals as recited in claim 3 wherein a portion of said auger overhangs said container opening, and the direction of rotation of the auger being such that the auger is forced by the material conveyed in a direction away from said opening.

6. A device for feeding stock animals as recited in claims 3 wherein a portion of said metering roll overhangs said container outlet and the direction of rotation of the metering roll being such that the roll is urged by the material being discharged away from said outlet.

7. A device for feeding stock animals as recited in claim 3 wherein said auger and metering roll rotate in the same direction.

8. A device for feeding stock animals as recited in claim 3 wherein said auger and metering roll rotate in different directions.

9. A device for feeding stock animals as recited in claim 3 wherein said lower section is directly beneath said opening between the sections, and said outlet being located beneath the curved portion of the upper section.

10. A device for feeding stock animals as recited in claim 3 wherein said power means includes variable speed means whereby the discharge rate of said metering rolls may be varied.

References Cited in the file of this patent
UNITED STATES PATENTS 1,840,505    Gray                  Jan. 12, 1932
2,981,229    Brown               Apr. 25, 1961